United States Patent Office 3,300,386
Patented Jan. 24, 1967

3,300,386
METHOD OF SELECTING EMULSIONS INTENDED FOR THE PREPARATION OF COSMETICS AND SKIN PRODUCTS
Robert Raymond Albert Georges Aron-Brunetiere, Paris, and Claude François Simon Alexandre Aron, Strasbourg, France, assignors of forty percent to Antoine Francois Regis Peyron, Paris, France
No Drawing. Filed July 3, 1962, Ser. No. 207,402
Claims priority, application France, July 10, 1961, 867,489
5 Claims. (Cl. 167—84.5)

It is well known that the skin calls for constant care and that the treatment varies according to the type of skin. Indeed, although the skin's structure varies from one person to another, the skin on the face and the chest is always characterized by an abundance of sebaceous glands, the activity and secretions of which govern most of the skin disorders liable to affect those parts of the body.

Generally speaking, skins can be classified as follows: depending on whether the production of sebum is normal, excessive or insufficient, the skin can be said to be normal, greasy or dry.

The care and treatment needed for these different kinds of skins naturally call for the use of creams or ointments having different qualities. Clearly, a cream which is suitable for a dry skin will not be suitable for a greasy skin, and vice versa.

No account will be taken in the present description of normal skins, which generally require no special care. Heretofore, the creams for use on the different types of skin have been chosen in an entirely empirical way. Thus a cream is said to be "for dry skins" when it looks thick and greasy, or "for greasy skins" when it seems light and more or less penetrating.

Studies have demonstrated the fagility of such criteria and have even gone as far as to demonstrate that such criteria can be entirely wrong in some cases, and that behind a label marked "for greasy kins" for instance, one may very often have a cream which is in fact intended for dry skins. It is hardly necessary to stress the manifest drawbacks of such mistakes, for which we have sought to offer a remedy.

As the result of an entirely unexpected observation, namely the change that occurs in the sebaceous glands of the guinea pig to which an emulsion intended for producing a cream has been applied, and as the result also of a judicious application of this observation, we have developed a method whereby a precise determination can be made of the composition of a cream or ointment suitable for a given type of skin. The method involves a study of the action on the sebaceous mechanism of the guinea pig of the two principal types of emulsions used for preparing creams, namely, an emulsion of oil in water (continuous aqueous phase) and an emulsion of water in oil (continuous oil phase). The method according to this invention includes several stages and requires in particular that several skin biopsies be made. These biopsies can be divided into two types: reference biopsies and biopsies of the tissues treated with emulsions, the object being to be able to make comparisons and determine whether an emulsion is suitable for manufacturing a cream for greasy skins or, on the contrary, a cream for dry skins.

In accordance with the invention, a piece of shaven skin having sustained no treatment whatsoever is first excised before the guinea pig's skin is treated with the emulsion whose quality is to be determined. This excision of untreated tissue consists in making a skin biopsy, preferably over the righthand dorsal area on the first day of the test. This biopsy will be called "Reference Biopsy No. 1."

In accordance with the invention, an application is then made of the preparation to determine whether it is suitable for dry skins or greasy skins. These applications are made by repeated fractions at fixed times five minutes every morning and evening, say for about ten days, on the guinea pig's skin, after the latter has been shaven over the lefthand dorsal area. (It should be noted that it is preferable to make these applications of the preparations under test on several animals at once—four or five for instance.) The emulsion to be examined is preferably applied in the cranio-caudal direction, using an electric appliance equipped with preferably circular and flat-topped polyvinyl resin pads which vibrate at between 500 and 900 cycles per second along a path of any given shape that lies in a plane parallel to the surface of the skin.

Although applications by means of the electric appliance hereinbefore referred to is to be recommended, manual applications can also achieve the desired results with the method according to this invention.

After the treatment with the emulsion has lasted about ten days, a piece of the treated skin is excised. This second biopsy is called an "experimental biopsy."

A third stage in the method consists in making a third excision of untreated skin on the tenth day of the experiment, so as to provide a second reference biopsy and to ensure results absolutely free from error.

It should be noted that this latter reference biopsy, though desirable for proper execution of the method, can be omitted if necessary since satisfactory results can in any case be obtained by comparing the first reference biopsy with the experimental biopsy of treated tissue or skin. This comparative study is the last stage of the selection method according to this invention.

It should be noted that the biopsies made, or rather the excisions resulting therefrom, are included with paraffin and the preparations coloured with hematoxylin and eosin.

A comparative study of the preparations obtained from the reference excisions and the experimental excision has shown that the application of an oil-in-water emulsion, in continuous aqueous phase, causes an increase in the volume of the sebaceous glands in 100% of the cases. This increase in volume, termed "hyperplasia," results both in a hypertrophy and multiplication of the sebaceous cells, the cores of which become globular and result in the section of the sebaceous globules becoming more numerous and being at the same time increased in volume along serial sections.

In contrast, an application of a water-in-oil emulsion, in continuous oil phase, produces no "hyperplasia"; on the contrary, the sebaceous glands remain stable and even reveal signs of regression in many cases.

Test revealing the "hyperplasia" of sebaceous glands, as hereinbefore indicated, were conducted with an oil-in-water emulsion in continuous aqueous phase of the following type:

| | G. |
|---|---|
| Stearin | 10 |
| Vaseline oil | 10 |
| Water | 75 |
| Emulsive (fatty alcohol condensate and ethylene oxide) | 5 |

The water-in-oil emulsion in continuous oil phase which resulted in a regression of the sebaceous glands had the following composition:

| | G. |
|---|---|
| Oil | 30 |
| Beeswax | 10 |
| White vaseline | 30 |
| Water | 25 |
| Fungicide | 0.1 |
| Emulsive (sorbitol oleate) | 5 |

The method according to this invention thus allows for discriminatory analysis of cosmetics and skin products, as regards their suitability for different types of skin, and consequently allows for precisely defining their scopes of utilization, which can be said to be more generally represented by continuous aqueous phase emulsion for dry skins and continuous oil phase emulsions for greasy skins.

The invention also has for its object a method of manufacturing skin ointments using the emulsion specifically discriminated between in the manner hereinbefore indicated, namely by means of two biopsies (reference biopsy +experimental biopsy) or three biopsies (two reference biopsies+one experimental biopsy) said biopsies being effected in the manner indicated hereinabove. In accordance with this manufacturing method, the ointments for greasy skins are made with the emulsions which have no effect on the sebaceous glands or which even cause a regression thereof, while the ointments for dry skins are made with the emulsions which have caused a "hyperplasia" of the sebaceous glands.

It should be noted that the discrimination method hereinbefore described, though it calls for the use of a guinea pig as a reference, can be executed by making excisions of tissues of different origin, and that the duration of the tests described can be modified to some extent without departing from the scope of the invention. This likewise applies to the method of manufacturing creams and ointments in accordance with this invention.

What is claimed is:

1. A method of testing emulsions to determine their suitability in the treatment of dry and greasy skins comprising effecting at least one biopsy of an untreated portion of the shaven skin of an animal, applying the emulsion to be tested on another portion of the shaven skin of the animal at spaced intervals for a predetermined interval, thereafter effecting at least one biopsy of the so-treated portion, comparing said biopsies to determine the effect of the treatment of the sebaceous glands of the skin, of an emulsion for treating dry skin causing hyperplasia of the sebaceous glands and an emulsion for treating greasy skins failing to cause hyperplasia of the sebaceous glands.

2. The method of claim 1 wherein the animal is guinea pig.

3. The method of claim 1 wherein the application of said emulsion is undertaken for a period of about 10 days before undertaking said biopsy of said so-treated portion.

4. The method of claim 1 wherein a biopsy of the untreated shaven skin of said animal is taken before said emulsion is applied to said shaven skin and a biopsy is taken of the untreated shaven skin after said emulsion is applied to said shaven skin.

5. The method of claim 1 wherein a biopsy of the untreated shaven skin of said animal is taken before said emulsion is applied to said shaven skin, application of said emulsion is undertaken for a period of about 10 days before undertaking said biopsy of said so-treated portion and undertaking a biopsy of the untreated shaven skin after said emulsion is applied to said so-treated portion for said period of time.

References Cited by the Examiner

Blank, Amer. Perf. and Aromatics, 67:5, May 1956, pp. 35–39.

Harry, British J. of Derm., March 1941, pp. 65–9, 74–8, 81–2.

Shelmire, J. of Invst. Derm., vol. 26, 1956, pp. 105–109.

JULIAN S. LEVITT, *Primary Examiner.*

FRANK CACCIAPAGLIA, JR., *Examiner.*

A. P. FAGELSON, V. C. CLARKE, *Assistant Examiners.*